(No Model.)

J. M. LOWREY.
SEED PLANTER.

No. 288,080. Patented Nov. 6, 1883.

Witnesses.
Edwin L. Yewell
J. J. McCarthy

Inventor.
J. M. Lowrey
By L.K.L. Alexander
Attorney.

N. PETERS, Photo-Lithographer, Washington, D. C.

UNITED STATES PATENT OFFICE.

JOHN M. LOWREY, OF PERDUE HILL, ALABAMA.

SEED-PLANTER.

SPECIFICATION forming part of Letters Patent No. 288,080, dated November 6, 1883.

Application filed June 9, 1883. (No model.)

*To all whom it may concern:*

Be it known that I, JOHN M. LOWREY, a citizen of the United States, residing at Perdue Hill, in the county of Monroe and State of Alabama, have invented certain new and useful Improvements in Seed-Planters, of which the following is a specification, reference being had therein to the accompanying drawings.

My invention relates to machines for distributing seed in the earth; and the object that I have in view is to provide one which will distribute two kinds of seed at one time, if so desired, or to distribute seed and at the same time a fertilizer. The peculiar means of doing this will be hereinafter more fully set forth.

Figure 1:
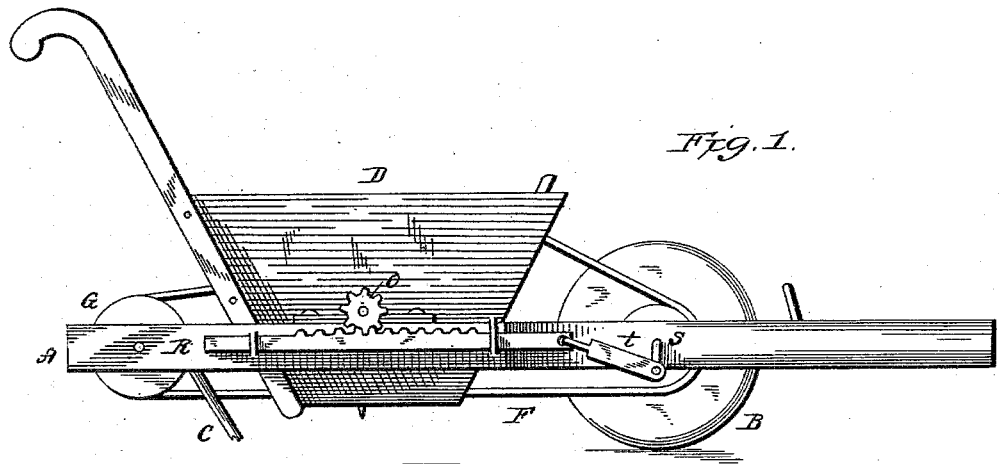
Figure 4:
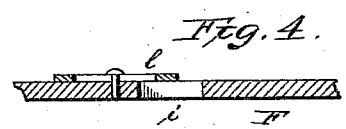
Figure 2:
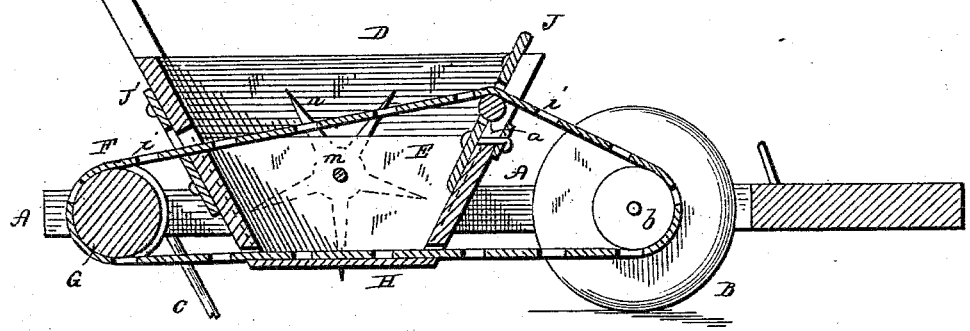
Figure 3:
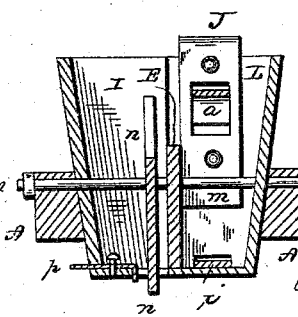

In the accompanying drawings, making part of this specification, Figure 1 represents a side elevation, Fig. 2 a longitudinal section, and Fig. 3 a vertical cross-section, of the seed-boxes; and Fig. 4 a section of a portion of the belt.

In the figures, A represents a rectangular frame, of any usual construction, upon which is mounted a seed-box, D. This box has two compartments.

E represents the division-board, which separates one from the other. One of these compartments, L, is intended for carrying corn or other grain, while that designated by I carries cotton-seed or any desirable fertilizing material.

Near the rear of the frame, and beneath it, are two arms, C C, which carry suitable covering-blades for the seed. The forward end of the frame is supported by means of a wheel, B. Upon the same shaft with wheel B is a band-pulley, b.

G represents a band drum or pulley located upon an axle near the rear of the frame and behind the arms C C.

F represents a band which runs around the pulleys G and b, said band passing in one direction through the upper portion of the seed-box, and in the other beneath the bottom of the box and over a board, H, secured to said bottom. This band is provided at suitable intervals with seed-apertures i i i, and these apertures are provided with adjustable slides l, for regulating their capacity, the said slide being held in place by set screws or pins or other suitable device. There are two slots in the hopper, one on the front side and one on the back. These slots are covered by slotted slides J and J'. The slide J carries a friction-roller, a. The belt F, in passing through the hopper, passes through the slots in these slides and over the roller a in slide J. The slides are for the purpose of regulating the tension of the belts, and may be secured in any position, placed by any suitable means. The belt F, when passing beneath the hopper, receives seed into its apertures from same. The seed are prevented from leaving their bottom board, H, until said apertures have passed beyond the end of the board. They then drop out and fall into the furrow made to receive them, and are covered up by the coverers attached to arms C C.

m represents a shaft which passes transversely through the center of the seed-box, having its bearings in the frame A upon each side of the box. Secured to this shaft is a wheel, n, having long teeth, which cut through an opening in the bottom of the cotton-seed box for the purpose of carrying out the cotton-seed, as is usual in this class of machines. It both stirs and carries the seed out. The opening in the bottom of this hopper is regulated by means of a slide, p. On one end of the shaft m is secured a pinion, o.

R represents a toothed or rack bar, which lies horizontally along one side of the frame H, being held in place by suitable keepers.

t represents a connecting-rod, which connects the bar R with a crank, S, on one end of the shaft of wheel B.

As the wheel B revolves the crank S imparts motion to the bar R through connecting-rod t. The pinion o gears into the teeth of bar R, and by said bar is given a reciprocating motion backward and forward, thereby imparting to wheel n the same motion in the cotton-seed hopper.

The bar R may be so arranged as to give a continuous motion, should such be desirable.

Either compartment can be used separately, or both used at one time, according to the necessities or desires of the planter.

The operation of this machine having been explained, what I claim, and desire to secure by Letters Patent, is—

The combination, with the hopper of a seed-planter, of a belt provided with seed-apertures, and mounted on suitable rollers, the adjusting slide and roller, and the sprocket-wheel and rack and pinion, whereby the belt is operated to drop the seed, substantially as specified.

In testimony whereof I affix my signature in presence of two witnesses.

JOHN M. LOWREY.

Witnesses:
GEO. STAFFENS,
J. S. HINES.